July 26, 1938. A. E. BENNETT 2,124,811
FLUID CONTROLLING MECHANISM FOR WEIGHING SCALES
Filed Oct. 1, 1936 2 Sheets-Sheet 1

Inventor
A. E. Bennett
By C. A. Snow & Co.
Attorneys.

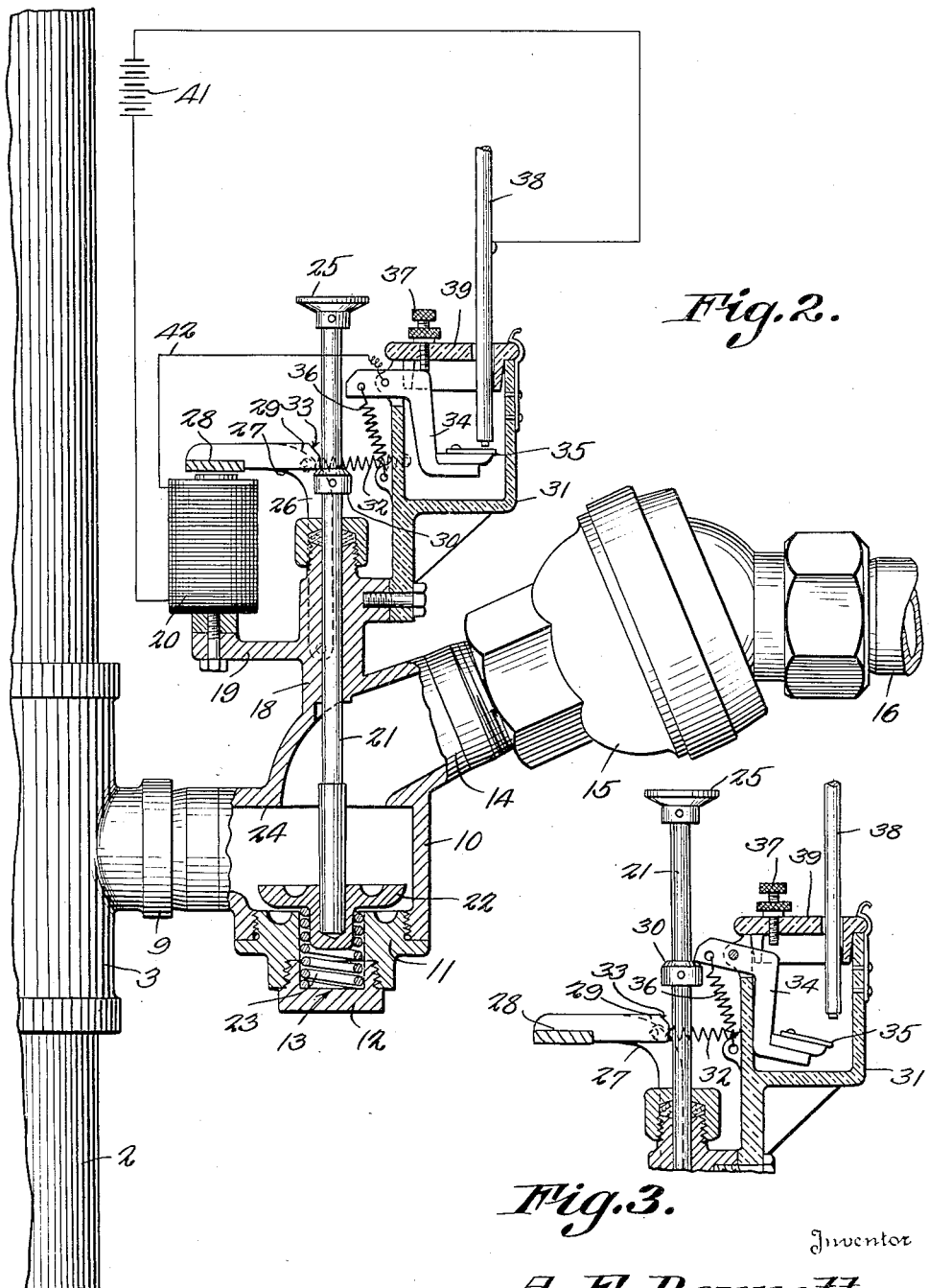

Patented July 26, 1938

2,124,811

UNITED STATES PATENT OFFICE 2,124,811

FLUID CONTROLLING MECHANISM FOR WEIGHING SCALES

Albert E. Bennett, Jacksonville, Fla.

Application October 1, 1936, Serial No. 103,532

1 Claim. (Cl. 137—139)

This invention consists of an apparatus for automatically controlling the flow of liquid or gas, and in this case is shown in connection with weighing scales for filling barrels, drums, cans, or other containers. The object of this invention is to automatically stop the flow of liquid at a point when the predetermined weight is reached, the construction being simple, easily set, and being automatically released by an electrically operated mechanism.

A further object is to provide a mechanism having means whereby it can be minutely adjusted to insure instant cutting off of the fluid when the predetermined weight is attained.

A still further object is to provide a novel form of latch for holding the valve of the fluid controlling mechanism open until the release thereof by the automatic mechanism employed.

A still further object is to provide a control mechanism which is formed of few parts and will not readily get out of order and which allows the apparatus to be operated at a high speed.

With the foregoing and other objects in view which will appear as the description proceeds, the invention resides in the combination and arrangement of parts and in the details of construction herein described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 2 is an enlarged section through the controlling mechanism, the circuit of said mechanism being shown in diagram.

Figure 3 is a section through a portion of the mechanism showing the positions of the parts when the valve is closed.

Figure 1:
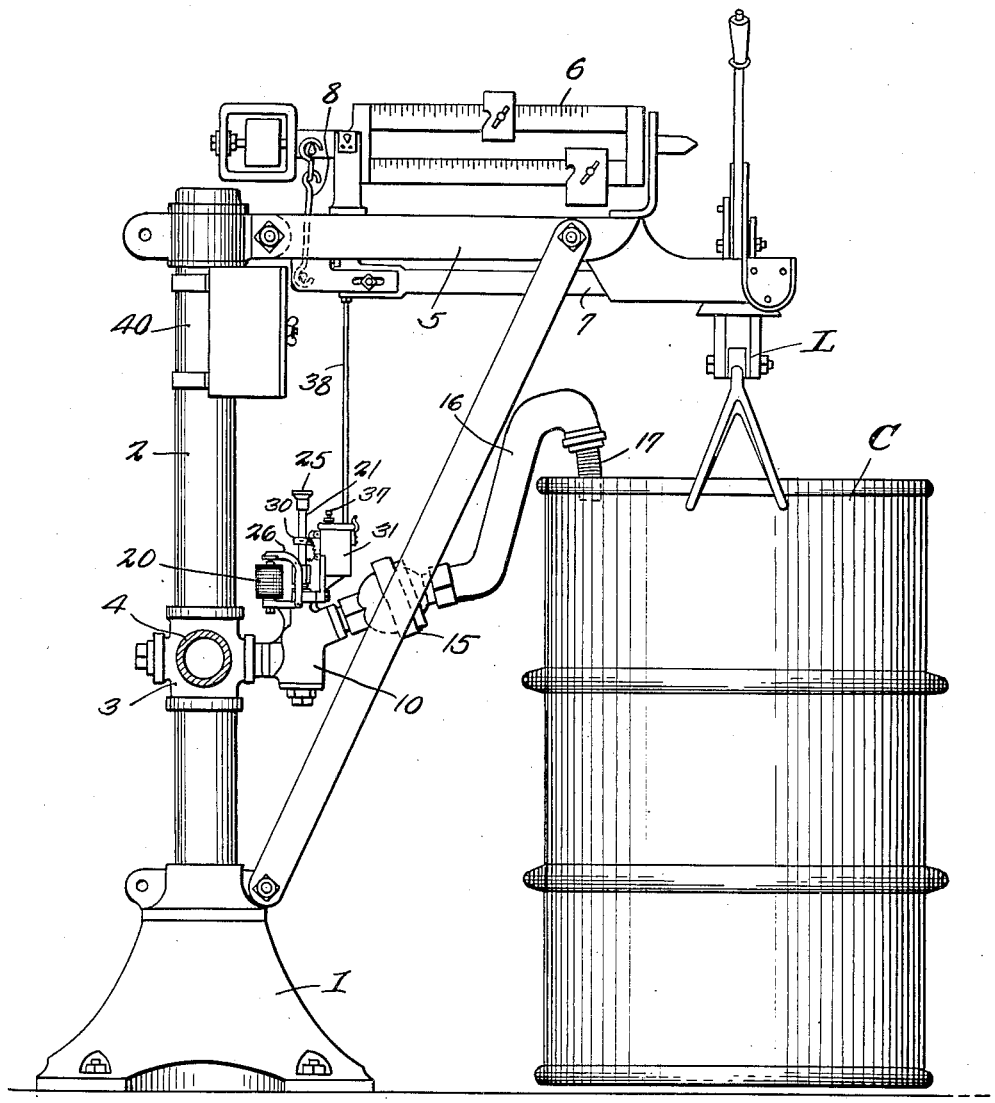
Figure 1 is an elevation of a weighing scales embodying the present improvement.

Referring to the figures by characters of reference 1 designates a base supporting a standard 2 and this standard includes a tubular portion 3 into which opens a supply pipe 4. An arm 5 is connected to and radiates from the standard, this arm supporting weighing mechanism indicated generally at 6 and which mechanism includes a beam 7 adapted to be shifted out of normal position when a container C, which is connected to the beam by any suitable mechanism such as a lift L, receives a predetermined weight of material. The construction and operation of this beam 7 is not important inasmuch as the same constitutes no part of the present invention. Said beam is coupled by a suitable hanger 8 to the scale beam 6 so that beam 7 will not be actuated by the container C and its load until the weight of the contents of the container is sufficient to tilt the beam 6.

The tubular portion 3 of the standard 2 has an outlet 9 opening into a valve casing 10. The bottom of this casing is closed by a tubular cap 11 the outer end of which is provided with a screw plug 12 in which is formed a recess 13. A tubular outlet 14 is extended from the top of the casing 10 and is inclined laterally, the outer end of this tubular outlet being connected by a universal ball and socket joint 15 to a tubular arm 16 provided with an outlet nozzle 17. This arm 16 is so proportioned and located that the nozzle 17 can be inserted readily into the opening in one end of the container C to be filled. The relative positions of this arm and contained have been illustrated in Figure 1.

A tubular stem 18 is provided on the outlet member 14 and has an arm 19 extending laterally therefrom for supporting an electromagnet 20. In this stem 18 is slidably mounted a rod 21 to the lower end of which is connected a valve 22. This valve is adapted to close upwardly against the top of the casing 10 so as to shut off communication between the interior of the casing and the outlet member 14. A spring 23, which is seated within the recess 13, bears against the valve and serves to hold it normally pressed against its seat 24. When the valve is in this closed position the pressure of fluid within the casing 10 and back of the valve tends to supplement the spring 23 in holding the valve in closed position.

Rod 21 extends beyond the stem 18 and has a head 25 whereby it can be pressed downwardly against the action of the spring 23 by the operator.

Pivotally connected to the stem 18 is a lever 26 the upper end of which is extended laterally as at 27 and carries an armature 28. A latch 29 in the form of a strip fixedly connected to the armature 28 is carried by the upper end of the lever 26 and is adapted to project into the path of a collar 30 which is secured to the rod 21. A contact casing 31 is connected to the stem 18 and a spring 32, which is attached to lever 26 and to the contact casing 31 serves to hold the latch 29 normally in the path of the collar 30. The latch 29 has its upper end portion beveled as shown at 33.

Pivotally connected to the contact casing 31 is an angular lever 34 one end of which carries a contact 35. The opposite end of the lever is engaged by a spring 36 connected to the casing 31 and which serves to hold lever 34 normally pressed against an adjustable stop 37 in the form of a screw. A contact rod 38 is connected to the beam 7 which constitutes an operating element therefor, and this rod is slidable within the top 39 of the casing 31. This rod is so proportioned that when the beam 7 is in its normal position the lower end of the rod is close to but out of engagement with the contact 35. The normal distance between the contact 35 and the end of the rod can be regulated by adjusting the screw 37 as will be obvious.

A box 40 can be mounted on the standard 2 for containing a battery 41 and one lead of this battery can be electrically connected to the rod 38 while the other lead is connected to the electromagnet 20. An electrical connection 42 is provided between the magnet and the lever 34.

Under normal conditions the valve 22 is closed as heretofore explained. At that time the collar 30 is in contact with the outer end of lever 34 so that said lever is held as indicated in Figure 3.

When it is desired to fill a container said container is brought to the position shown for example in Figure 1 or in any other position permitting the insertion of the nozzle 17. At this time the container is supported solely by the lift L and the beam mechanism of the scales. Following the placing of the container the rod or plunger 21 is depressed so that collar 30 will move away from lever 34 and snap past and in engagement with the latch 29. Thus the valve 22 will be opened to the position shown in Figure 2 and lever 34 will swing against stop 37 with the contact 35 slightly spaced from the end of the rod 38. The parts will remain in these positions until the liquid directed into the container C reaches a predetermined weight whereupon the weighing mechanism will be actuated, the downward movement of beam 7 causing the rod 38 to come against the contact 35. Simultaneously with this action the circuit through the electromagnet 20 will be closed and said magnet will be energized. Consequently the armature 28 will be attracted toward the magnet but as it cannot move along a straight line because carried by the lever 26, it will swing laterally and downwardly toward the magnet a sufficient distance to withdraw the latch 29 from the path of the collar 30. Consequently the rod 21 will immediately snap to closed position, thereby cutting off the supply of liquid to the outlet 14. As the rod 21 reaches its upper or normal position the collar 30 will come against the end of lever 34 so as to shift said lever and move the contact 35 away from the rod 38, thereby positively breaking the circuit. As soon as the container is removed rod 38 will move up to its normal position so that when lever 34 is next released by the depression of the rod 21 the circuit will not be closed until rod 38 again descends into engagement with the contact 35.

Obviously by providing a simple control mechanism such as described, the operation of filling a container can be carried on very rapidly and accurately. Instead of providing the scales with only a single container supporting mechanism and weighing mechanism as described, the mechanism disclosed may be duplicated by providing two or more weighing and controlling units about the standard 2 as will be obvious.

What is claimed is:

The combination with a casing having an inlet and an outlet, a spring-pressed valve for closing the outlet, and a stem projecting from the valve and slidably engaging the casing, of a collar on the stem, a spring-restrained latch positioned to overly the collar and hold the valve in open position, an armature carried by the latch, a contact lever having one arm projecting into the path of the collar, a contact element normally spaced from the other arm of the lever, an electromagnet adjacent to the armature, said contact element, contact lever and electromagnet being included in an electric circuit, said contact element when moved in one direction, constituting means for closing the circuit through the electromagnet and the contact lever thereby to energize the magnet and attract the armature to disengage the latch from the collar, and said collar constituting means, when released, for engaging the contact lever to break the connection between said lever and the contact element, and a head on the valve stem for receiving thrust from an operator thereby to shift the collar from the contact lever and into engagement with the latch and to open the valve against the action of the valve spring.

ALBERT E. BENNETT.